United States Patent
Vermonet et al.

(10) Patent No.: US 7,124,020 B2
(45) Date of Patent: Oct. 17, 2006

(54) SYSTEM FOR CALIBRATING APPARATUS FOR ACQUIRING THE PRESSURE IN A MOTOR VEHICLE DIESEL ENGINE CYLINDER

(75) Inventors: Claire Vermonet, Paris (FR); Guillaume Meissonnier, Lanes le Gaulois (FR); Cédric Lorret, Paris (FR); Jean-Marie Vespasien, La Garenne Colombes (FR)

(73) Assignees: Peugeot Citroen Automobiles SA, Velizy-Villacoublay (FR); Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/993,134

(22) Filed: Nov. 22, 2004

(65) Prior Publication Data
US 2005/0125140 A1 Jun. 9, 2005

(30) Foreign Application Priority Data
Nov. 24, 2003 (FR) ................................. 03 13755

(51) Int. Cl.
*G01M 15/08* (2006.01)
(52) U.S. Cl. .......................... 701/114; 73/1.59; 73/115
(58) Field of Classification Search .................... None
See application file for complete search history.

(56) References Cited

U.S. PATENT DOCUMENTS 4,944,271 A 7/1990 Iwata et al.
6,684,151 B1* 1/2004 Ring ........................... 701/110
2005/0039721 A1* 2/2005 Truscott et al. .......... 123/406.22

FOREIGN PATENT DOCUMENTS

| DE | 199 00 738 C1 * | 6/2000 |
| DE | 100 28 885 | 12/2001 |
| EP | 0 399 069 | 11/1990 |
| WO | WO 02/095191 A2 * | 11/2002 |

OTHER PUBLICATIONS

Patent Abstracts of Japan, Publication No. 60111935, dated Jun. 18, 1985. Cited in the French Search Report.

* cited by examiner

*Primary Examiner*—Andrew M. Dolinar
(74) *Attorney, Agent, or Firm*—Nicolas E. Seckel

(57) ABSTRACT

The invention relates to a system for calibrating apparatus (28) for acquiring the pressure in a cylinder (10) of a motor vehicle diesel engine, of the type comprising a cylinder pressure sensor (30) associated with the cylinder and means (32) for conditioning the signal delivered by the sensor (30) as a function of conditioning parameters. The calibration system comprises means (64) for collecting a signal delivered by the cylinder pressure sensor (30), an information processing unit (34) adapted to determine the values of the conditioning parameters as a function of a polytropic thermodynamic model of the evolution of the pressure in the cylinder, a reference pressure of the pure compression phase of the cycle of the cylinder, and the signal delivered by the pressure sensor (30) and collected by the collecting means (64), and means (66) for modifying the values of the conditioning parameters in the acquisition apparatus (28) as a function of the values of the conditioning parameters determined by the information processing unit (34).

13 Claims, 2 Drawing Sheets

SYSTEM FOR CALIBRATING APPARATUS FOR ACQUIRING THE PRESSURE IN A MOTOR VEHICLE DIESEL ENGINE CYLINDER

The present invention relates to a system for calibrating apparatus for acquiring the pressure in a motor vehicle diesel engine cylinder.

The present invention relates more particularly to the calibration of apparatus for acquiring the pressure in a diesel engine cylinder of the type provided with an exhaust gas recirculation circuit and a turbocharger.

BACKGROUND OF THE INVENTION

Systems that use information relating to the pressure in the cylinders to control or diagnose the operating state of a diesel engine are known in the art. The accuracy of control or diagnosis depends on the accuracy of the apparatus for acquiring the pressure in the cylinders.

In the conventional way, a cylinder pressure sensor and conditioning means are used to acquire the pressure in a cylinder. The sensor comprises an active component that constitutes the component sensitive to the measured physical magnitude. However, the signal delivered by the sensor generally needs to be processed to obtain a "measurement" signal that is significant of the measured physical magnitude. For example, if the active component of the sensor is a piezo-electric component that is sensitive to a deformation to which it is subjected, the signal that it delivers corresponds to a range of deformation values. The conditioning means are adapted to format this signal and to apply conditioning parameters to make this range of deformation values correspond to a range of pressure values.

Calibration methods that obtain the correspondence between the range of deformation values and the range of pressure values, i.e. that determine the conditioning parameter values, for a family of sensors of the same design are known in the art. This correspondence, which is determined by the manufacturer of the sensor, for example, or by post-production tests on a sample of sensors mounted on motor vehicles, is then stored permanently in the conditioning means throughout the service life of the motor vehicle.

Unfortunately, the values of the characteristics of the sensors are subject to significant spread.

Accordingly, mass-produced sensors are subject to an uncertainty as to their sensitivity that may vary strongly from one sensor to another, and as a consequence there is significant uncertainty for a particular sensor if the values of the conditioning parameters have been determined for a family of sensors.

Also, the characteristics of the sensor are subject to drift during its service life, for example as it wears. Accordingly, at the end of a certain time, the original values of the conditioning parameters are no longer valid and the resulting measurement error is uncertain.

OBJECTS AND SUMMARY OF THE INVENTION

An object of the present invention is to solve the problem referred to above by proposing a system for automatically calibrating the signal delivered by a diesel engine cylinder pressure sensor, which system is specifically adapted to calibrate the signal delivered by the sensor in a manner that is robust in relation to uncertainties as to the characteristics of the sensor.

To this end, the present invention consists in a system for calibrating apparatus for acquiring the pressure in a cylinder of a motor vehicle diesel engine, of the type comprising a cylinder pressure sensor associated with the cylinder and means for conditioning a signal delivered by the sensor as a function of conditioning parameters, which calibration system comprises:

means for collecting the signal delivered by the cylinder pressure sensor;

an information processing unit adapted to determine the values of the conditioning parameters as a function of a polytropic thermodynamic model of the evolution of the pressure in the cylinder, a reference pressure of the pure compression phase of the cycle of the cylinder, and the signal delivered by the pressure sensor and collected by the collecting means; and means for modifying the values of the conditioning parameters in the acquisition apparatus as a function of the values of the conditioning parameters determined by the information processing unit.

According to other features of the system:

the information processing unit comprises determination means adapted to determine the value of the conditioning parameters as a function of pressure values in the combustion chamber of a pure compression polytropic model of the cycle of the cylinder from the equation:

$$P(\theta) = P_0 \left(\frac{V_0}{V(\theta)}\right)^\gamma$$

in which $\theta$ is a value of the crankshaft angle of the cylinder, $V_0$ is the volume of the combustion chamber of the cylinder for a predetermined value of the crankshaft angle of the pure compression phase of the cycle of the cylinder, $P_0$ is a predetermined reference pressure in the combustion chamber for the predetermined value of the crankshaft angle, $\gamma$ is a polytropic coefficient, $V(\theta)$ is the volume of the combustion chamber for the value of the crankshaft angle $\theta$ of the cylinder, and $P(\theta)$ is the pressure in the combustion chamber for the value of the crankshaft angle $\theta$ of the cylinder;

the determination means are adapted to determine the conditioning parameters of a conditioning model of the signal delivered by the cylinder pressure sensor from the equation:

$$P_{meas} = A \times U + P_{offset}$$

in which U is the signal delivered by the pressure sensor, $P_{offset}$ is an offset, A is a gain, and $P_{meas}$ is the measured cylinder pressure delivered by the conditioning means;

the determination means are adapted to determine the gain A and the offset $P_{offset}$ of the conditioning means from the equations:

$$A = \frac{1}{M}\sum_{j=1}^{M} P_0(j) * \frac{\left(\dfrac{V_0}{\frac{1}{N}\sum_{i=1}^{N} V(\theta_2^i)}\right)^\gamma - \left(\dfrac{V_0}{\frac{1}{Q}\sum_{k=1}^{Q} V(\theta_1^k)}\right)^\gamma}{\frac{1}{N}\sum_{i=1}^{N} U(\theta_2^i, j) - \frac{1}{Q}\sum_{k=1}^{Q} U(\theta_1^k, j)}$$

-continued $$P_{offset} = P_0(j) * \frac{\left(\frac{V_0}{\frac{1}{R}\sum_{i=1}^{R} V(\theta_3^i)}\right)^\gamma * \frac{1}{S}\sum_{k=1}^{S} U(\theta_4^k, j) - \left(\frac{V_0}{\frac{1}{S}\sum_{k=1}^{S} V(\theta_4^k)}\right)^\gamma * \frac{1}{R}\sum_{i=1}^{R} U(\theta_3^i, j)}{\frac{1}{S}\sum_{k=1}^{S} U(\theta_4^k, j) - \frac{1}{R}\sum_{i=1}^{R} U(\theta_3^i, j)}$$

in which:

M, N, Q, R and S are predetermined numbers;

$\{\theta_1^k; k=1, \ldots, Q\}$, $\{\theta_2^i; i=1, \ldots, N\}$, $\{\theta_3^i; i=1, \ldots, R\}$ and $\{\theta_4^k; k=1, \ldots, S\}$ are predetermined sets of crankshaft angle values respectively contained in first, second, third and fourth crankshaft angle value windows of the pure compression phase of the cycle;

$\{V(\theta_1^k); k=1, \ldots, Q\}$, $\{V(\theta_2^i); i=1, \ldots, N\}$, $\{V(\theta_3^i); i=1, \ldots, R\}$ and $\{V(\theta_4^k); k=1, \ldots, S\}$ are the sets of values of the volume of the combustion chamber for the sets of crankshaft angle values contained in the first, second, third and fourth windows of the pure compression phase of the cycle of the cylinder, respectively;

$\{U(\theta_1^k,j); k=1, \ldots, Q\}$, $\{U(\theta_2^i,j); i=1, \ldots, N\}$, $\{U(\theta_3^i,j); i=1, \ldots, R\}$ and $\{U(\theta_4^k,j); k=1, \ldots, S\}$ are the sets of values of the signal delivered by the cylinder pressure sensor during the $j^{th}$ cycle of the cylinder for the sets of crankshaft angle values contained in the first, second, third and fourth windows of the pure compression phase of the cycle of the cylinder, respectively; and $P_0(j)$ is the reference pressure for the $j^{th}$ cycle of the cylinder;

the values $\theta_1^i$ and $\theta_3^i$ are values of the crankshaft angle at the beginning of the pure compression phase of the cycle of the cylinder and the values $\theta_3^i$ and $\theta_4^k$ are values of the crankshaft angle at the end of the pure compression phase of the cycle of the cylinder;

each of the crankshaft angle values $\theta_1^i$, $\theta_2^i$, $\theta_3^i$ and $\theta_4^k$ is determined to optimize the signal-to-noise ratio of the signal delivered by the pressure sensor for the value of the crankshaft angle;

the engine is equipped with exhaust gas recirculation means connected to a turbocharger and the information processing unit comprises means for determining the reference pressure $P_0$ as a function of the boost pressure at the output of the turbocharger;

the means for determining the reference pressure $P_0$ are connected to the determination means and are adapted to determine the reference pressure $P_0$ from the equation:

$$P_0 = \alpha \times P_{boost}$$

in which $\alpha$ is a value of a filling coefficient and $P_{boost}$ is a value of the boost pressure at the output of the turbocharger for the crankshaft angle of the cylinder corresponding to the bottom dead centre point of the cycle of the cylinder;

the information processing unit comprises means for selecting the value of the filling coefficient as a function of the cylinder type and the value of the engine rpm;

the information processing unit comprises triggering means connected to the determination means and adapted to trigger the determination of the gain of the conditioning model as a function of a predetermined law governing triggering the determination of the gain of the conditioning model;

the triggering means are adapted to trigger the determination of the gain of the conditioning model when the motor vehicle has traveled a number of kilometers since the preceding determination of the gain of the conditioning model greater than or equal to a predetermined kilometer threshold value;

the triggering means are adapted to trigger the determination of the gain of the conditioning model when a time has elapsed since the preceding determination of the gain of the conditioning model greater than or equal to a predetermined time threshold value;

the determination means are adapted to determine the offset of the conditioning model continuously; and the pressure sensor is a sensor adapted to measure a deformation of the structure of the engine.

BRIEF DESCRIPTION OF THE DRAWINGS

The present invention will be better understood on reading the following description, which is given by way of example and with reference to the appended drawings, in which.

MORE DETAILED DESCRIPTION

Figure 1:
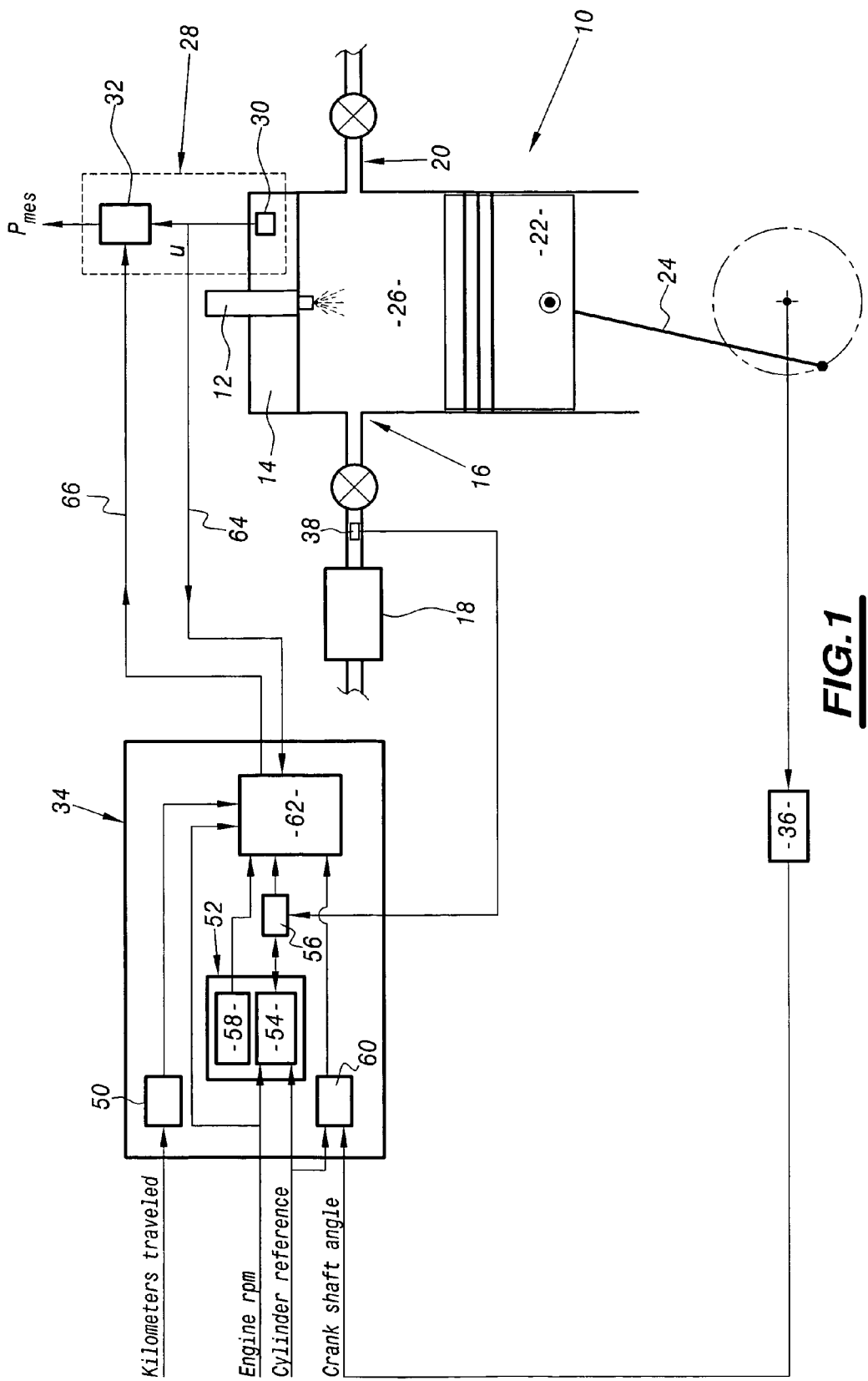
FIG. 1 is a diagrammatic view of a diesel engine cylinder associated with apparatus for acquiring the pressure in the cylinder that is calibrated by a calibration system of the invention.

FIG. 1 shows diagrammatically a cylinder 10 of a diesel engine.

The cylinder 10 of the engine is equipped with a fuel injector 12 mounted in a cylinder head 14 of the cylinder and comprises an inlet port 16 for a mixture of air and exhaust gas coming from a turbocharger 18 connected to an exhaust gas recirculation system, and a burned gas exhaust port 20. The interior volume of the cylinder 10, which is delimited by the cylinder head 14 and a piston 22 connected to a connecting rod 24, defines a combustion chamber 26 whose volume varies as a function of the crankshaft angle of the cylinder 10.

The cylinder 10 of the engine is associated with apparatus 28 for acquiring the pressure in the cylinder that measures the pressure in the combustion chamber 26 of the cylinder, for example for the purposes of controlling the operation of the engine.

The pressure acquisition apparatus 28 comprises a cylinder pressure sensor 30 that delivers a signal U that depends on the pressure in the cylinder and conditioning means 32 that condition the signal U delivered by the sensor.

For example, the pressure sensor 30 comprises a piezo-electric component and is mounted on or in the cylinder head 14 of the cylinder. The sensor 30 delivers the signal U as a function of the deformation to which the piezo-electric component is subjected by the pressure variation in the combustion chamber 26 of the cylinder.

The conditioning means 32 are adapted to process the signal U that they receive as input and supply as output the signal $P_{meas}$ conforming to the following equation, in which $P_{offset}$ is an offset for the sensor and A is a gain for the sensor:

$$P_{meas} = A \times U + P_{offset} \tag{1A}$$

An information processing unit 34 receives as input a measured value of the angle of the engine shaft from an engine shaft angle sensor 36, for example a Hall effect magnetic sensor comprising a toothed wheel associated with the engine shaft. The information processing unit 34 further comprises inputs for the value of the engine rpm (rotation speed in revolutions per minute) delivered by an engine rpm sensor (not shown) and the number of kilometers traveled by the motor vehicle.

The information processing unit 34 also receives as input a measured value of the boost pressure $P_{boost}$ from a boost pressure sensor located at the output of the turbocharger 18 and the signal U delivered by the pressure sensor 30.

The information processing unit 34 is adapted to determine values of the gain A and the offset $P_{offset}$ using an algorithm employing values of the engine rpm, the signal U delivered by the sensor, the boost pressure $P_{boost}$, the angle of the engine shaft, and the number of kilometers traveled by the motor vehicle, as explained in more detail hereinafter.

To this end, it comprises triggering means 50 adapted to trigger the determination of the gain A as a function of the number of kilometers traveled.

The information processing unit 34 also comprises a non-volatile memory 52 which contains a look-up table 54 that delivers a predetermined value of a filling coefficient α linking the mass of air admitted into the cylinder to the pressure in the inlet manifold of the engine as a function of the reference of the cylinder for which the associated pressure acquisition apparatus is calibrated and the value of the engine rpm.

The memory 52 is connected to means 56 for determining a reference pressure value $P_0$ of the pure compression phase of the cycle of the cylinder as a function of the measured value of the boost pressure $P_{boost}$ and the selected value of the filling coefficient α. The memory 52 also contains a list 58 of determination parameters used to determine the values of the gain A and the offset $P_{offset}$.

Means 60 in the information processing unit 34 for determining the crankshaft angle receive as input the measured value of the engine shaft angle delivered by the engine shaft angle sensor 36 and deliver a crankshaft angle value as a function of the cylinder reference. This is known in the art.

The information processing unit 34 further comprises means 62 for determining conditioning parameters connected to means 64 for collecting the signal U delivered by the pressure sensor 30. The determination means 62 further receive as input the outputs of the triggering means 50, the memory 52, the reference pressure determination means 56, and the cylinder crankshaft angle determination means 60.

The determination means 62 are adapted to determine the values of the conditioning parameters A and $P_{offset}$ in accordance with a polytropic thermodynamic model of the pressure in the combustion chamber of the cylinder conforming to the following equation:

$$P(\theta) = P_0\left(\frac{V_0}{V(\theta)}\right)^\gamma \quad (1B)$$

in which $V_0$ is the volume of the combustion chamber for a predetermined value of the crankshaft angle of the pure compression phase of the cycle of the cylinder, $P_0$ is a predetermined value of the pressure in the combustion chamber for the predetermined value of the crankshaft angle, γ is a polytropic coefficient, V(θ) is the volume of the combustion chamber for the value θ of the crankshaft angle, and P(θ) is the theoretical value of the pressure in the combustion chamber for the value θ of the crankshaft angle.

It is clear that, on receiving as input a reference pressure value $P_0$ for the pure compression phase of a cycle of the cylinder and the value of the crankshaft angle that determines with certainty the volume of the combustion chamber, the determination means 62 are able to determine the theoretical value of the pressure in the combustion chamber for any point of the pure compression cycle of the cycle concerned of the cylinder.

Knowing the theoretical value of the pressure in the combustion chamber of the cylinder, the determination means 62 are able to determine values of the gain and the offset from the following equations:

$$A = \frac{1}{M}\sum_{j=1}^{M} P_0(j) * \frac{\left(\frac{V_0}{\frac{1}{N}\sum_{i=1}^{N} V(\theta_2^i)}\right)^\gamma - \left(\frac{V_0}{\frac{1}{Q}\sum_{k=1}^{Q} V(\theta_1^k)}\right)^\gamma}{\frac{1}{N}\sum_{i=1}^{N} U(\theta_2^i, j) - \frac{1}{Q}\sum_{k=1}^{Q} U(\theta_1^k, j)} \quad (2)$$

$$P_{offset} = P_0(j) * \frac{\left(\frac{V_0}{\frac{1}{R}\sum_{i=1}^{R} V(\theta_3^i)}\right)^\gamma * \frac{1}{S}\sum_{k=1}^{S} U(\theta_4^k, j) - \left(\frac{V_0}{\frac{1}{S}\sum_{k=1}^{S} V(\theta_4^k)}\right)^\gamma * \frac{1}{R}\sum_{i=1}^{R} U(\theta_3^i, j)}{\frac{1}{S}\sum_{k=1}^{S} U(\theta_4^k, j) - \frac{1}{R}\sum_{i=1}^{R} U(\theta_3^i, j)} \quad (3)$$

$$P_0(j) = \alpha(RPM)(j), \text{ref.\_cylinder}) \times P_{boost}(j) \quad (4)$$

in which:

M, N, Q, R and S are predetermined numbers, stored in the list 58 of parameters in the memory 52;

$\{\theta_1^k; k=1, \ldots, Q\}$ is a predetermined set of crankshaft angle values contained in a first crankshaft angle value window of the pure compression phase of the cycle of the cylinder stored in the list 58 of parameters of the memory 52;

$\{V(\theta_1^k); k=1, \ldots, Q\}$ is the set of values of the volume of the combustion chamber 26 for all crankshaft angle values contained in the first window of the pure compression phase of the cycle of the cylinder, this set of volume values being stored in the list 58 of parameters in the memory 52;

$\{\theta_2^i; i=1, \ldots, N\}$ is a predetermined set of crankshaft angle values contained in a second crankshaft angle value window of the pure compression phase of the cycle of the cylinder stored in the list 58 of parameters in the memory 52;

$\{V(\theta_2^i); i=1, \ldots, N\}$ is the set of values of the volume of the combustion chamber 26 for all values of the crankshaft angle in the second window of the pure compression phase of the cycle of the cylinder, this set of volume values being stored in the list 58 of parameters in the memory 52;

$\{\theta_3^i; i=1, \ldots, R\}$ is a predetermined set of crankshaft angle values contained in a third crankshaft angle value window of the pure compression phase of the cycle of the cylinder stored in the list 58 of parameters in the memory 52;

$\{V(\theta_3^i); i=1, \ldots, R\}$ is the set of values of the volume of the combustion chamber 26 for all values of the crankshaft angle contained in the third window of the pure compression phase of the cycle of the cylinder, this set of volume values being stored in the list 58 of parameters in the memory 52;

$\{V(\theta_4^k); k=1, \ldots, S\}$ is a predetermined set of crankshaft angle values contained in a fourth crankshaft angle value window of the pure compression phase of the cycle of the cylinder stored in the list 58 of parameters in the memory 52;

$\{(\theta_4^k); k=1, \ldots, S\}$ is the set of values of the volume of the combustion chamber 26 for all values of the crankshaft angle contained in the fourth window of the pure compression phase of the cycle of the cylinder, this set of volume values being stored in the list 58 of parameters in the memory 52;

$\{(\theta_1^k, j); k=1, \ldots, Q\}$ is the set of values of the signal delivered by the cylinder pressure sensor 30 during the $j^{th}$ cycle of the cylinder for all values of the crankshaft angle contained in the first window of the pure compression phase of the cycle of the cylinder;

$\{U(\theta_2^i, j); i=1, \ldots, N\}$ is the set of values of the signal delivered by the cylinder pressure sensor 30 during the $j^{th}$ cycle of the cylinder for all values of the crankshaft angle contained in the second window of the pure compression phase of the cycle of the cylinder;

$\{(\theta_3^i, j); i=1, \ldots, R\}$ is the set of values of the signal delivered by the cylinder pressure sensor 30 during the $j^{th}$ cycle of the cylinder for all values of the crankshaft angle contained in the third window of the pure compression phase of the cycle of the cylinder;

$\{(\theta_4^k, j); k=1, \ldots, S\}$ is the set of values of the signal delivered by the cylinder pressure sensor 30 during the $j^{th}$ cycle of the cylinder for all values of the crankshaft angle contained in the fourth window of the pure compression phase of the cycle of the cylinder; and RPM(j) is the value of the engine rpm when the crankshaft angle corresponds to the bottom dead centre point of the j th cycle of the cylinder, ref._cylinder is the reference of the cylinder, $\alpha$(RPM(j).ref._cylinder) is a value of the filling coefficient of the look-up table 54 determined as a function of the value RPM(j) of the engine rpm and the cylinder reference ref._cylinder, and $P_0(j)=\alpha$(RPM(j).ref._cylinder)$\times P_{boost}(j)$ is the reference pressure for the $j^{th}$ cycle of the cylinder equal to the value $\alpha$(RPM(j).ref._cylinder) multiplied by the value of the boost pressure $P_{boost}(j)$ determined when the crankshaft angle corresponds to the bottom dead centre point of the $j^{th}$ cycle of the cylinder.

The values determined in the above manner are fed to means 66 for modifying the conditioning parameters of the conditioning means 32 of the apparatus 28 for acquisition of the pressure in the cylinder in order for the means 66 to update the value of the conditioning parameters in the conditioning means 32.

Note that the person skilled in the art may envisage many different ways of determining the values of the gain A and the offset $P_{offset}$ from equations (1A) and (1B). The above equations (2) and (3) correspond to the preferred embodiment of a system of the invention. However, other equations may be used. For example, by setting N=Q and R=S, it is possible to calculate the value of the gain A and the value of the offset $P_{offset}$ from the following equations, in which T is a predetermined number:

$$A = \frac{1}{N \times M} \sum_{j=1}^{M} P_0(j) \sum_{i=1}^{N} \frac{\left(\frac{V_0}{V(\theta_2^i, j)}\right)^\gamma - \left(\frac{V_0}{V(\theta_1^i, j)}\right)^\gamma}{U(\theta_2^i, j) - U(\theta_1^i, j)}$$

$$P_{Offset} = \frac{1}{T \times R} \sum_{j=1}^{T} P_0(j) \sum_{i=1}^{R} \frac{\left(\frac{V_0}{V(\theta_4^i, j)}\right)^\gamma \times U(\theta_3^i, j) - \left(\frac{V_0}{V(\theta_3^i, j)}\right)^\gamma \times U(\theta_4^i, j)}{U(\theta_4^i, j) - U(\theta_3^i, j)}$$

Figure 2:
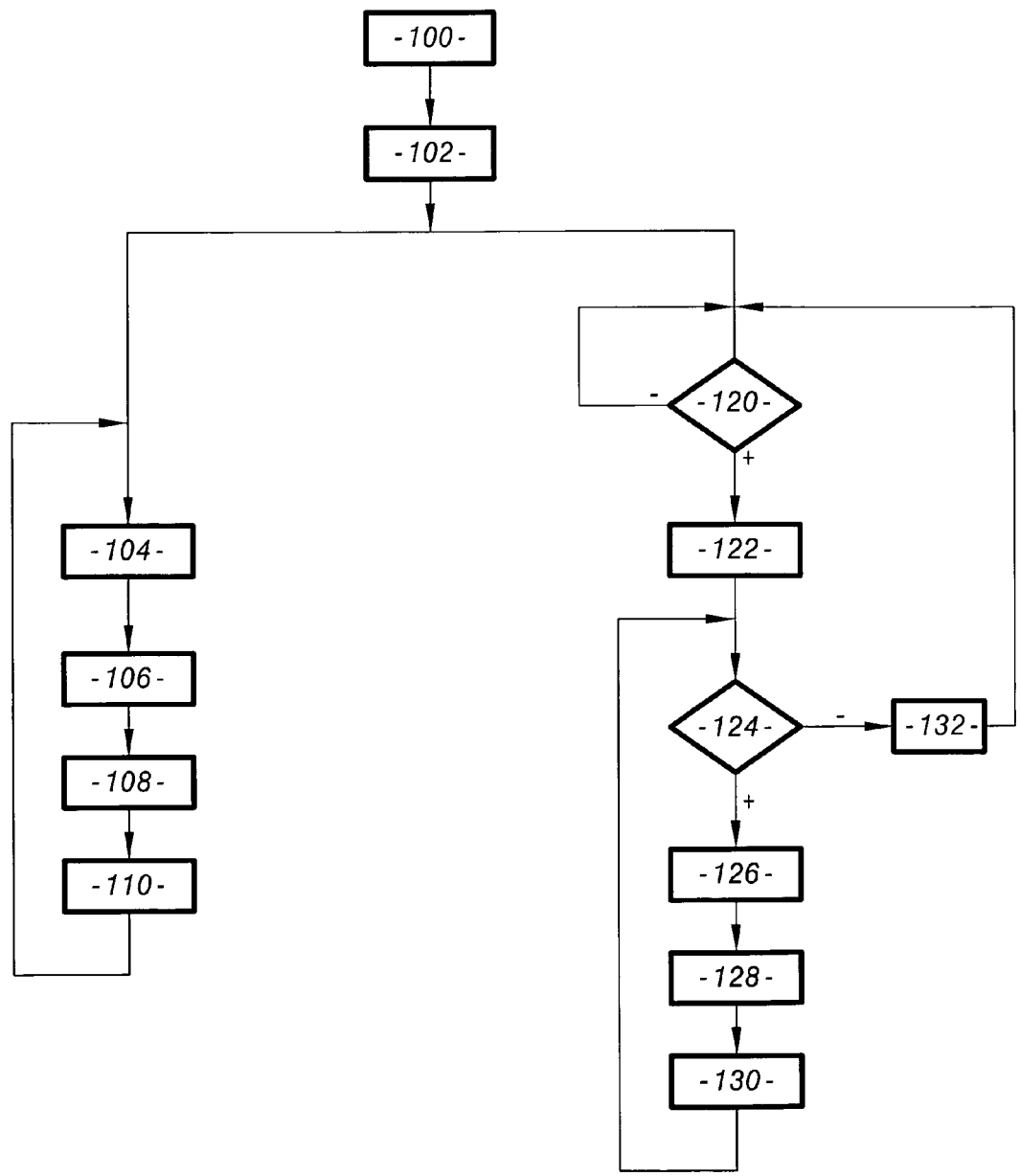
FIG. 2 is a flowchart of the operation of a calibration system of the invention.

The operation of the information processor unit is explained next with reference to the FIG. 2 flowchart.

After the motor vehicle is started for the first time, in a step 100, a strategy of calibration of the apparatus for acquiring the pressure in the cylinder is initialized. The initialization of the calibration strategy consists in particular in determining the period for calibration of the acquisition apparatus and selecting the crankshaft angle values to be used to determine the values of the gain and the offset. A preferred mode of operation of the calibration system according to the invention consists in determining the offset $P_{offset}$ continuously, i.e. determining a value of the offset for each cycle of the cylinder, and determining the gain A regularly. This initialization therefore further consists in choosing the number of kilometers traveled by the motor vehicle between two determinations of the value of the gain A.

In the next step 102, triggered in succession to starting the engine, the values of the parameters from the list 58 of parameters used to determine the conditioning parameters from equations (2) and (3) are loaded into the determination means (62) from the list 58 of parameters of the memory 52.

The optimum value of each of the parameters has been calculated beforehand, for example. Thus each of the angle values has been determined to optimize the signal-to-noise ratio for the corresponding value of the signal delivered by the sensor 30 and so that the chosen crankshaft angle values $\theta_1^k$, $\theta_2^i$ are at the beginning of the pure compression phase of the cycle of the cylinder and the chosen crankshaft angle values $\theta_3^i$ and $\theta_4^k$ are at the end of the pure compression phase of the cycle of the cylinder.

Moreover, it is to be noted that in the vicinity of the bottom dead centre point of the cycle of the cylinder that defines the beginning of the pure compression phase, the cylinder head is deformed significantly by the pressure variations generated by the combustion of fuel in the adjoining cylinders. Consequently, a piezoelectric pressure sensor delivers a signal having a significant component that depends on combustion in the adjoining cylinders. In the case of a sensor of this type, the chosen crankshaft angle values $\theta_1^k$, $\theta_2^i$, $\theta_3^i$ and $\theta_4^k$ therefore also advantageously belong to a range of angle values for which the signal delivered by the sensor 30 does not contain noise caused by combustion in the adjoining cylinders.

On completion of the initialization of the determination parameters, in a step 104, a first buffer memory (not shown) of the determination means 62 is initialized.

In the next step 106, the means 56 for determining the reference pressure $P_0$ interrogate the look-up table 54, which supplies them with the value of the filling coefficient as a function of the reference of the cylinder and of the value of the engine rpm when the crankshaft angle corresponds to the bottom dead centre point of the cycle of the cylinder. The means 56 then multiply this value of the filling coefficient by the value of the boost pressure corresponding to the bottom dead centre point to form the reference pressure $P_0$ for the current cycle of the cylinder (equation (3)). This reference pressure value is then fed to the determination means 62 and stored in the first buffer memory for subsequent use. In a step 108 subsequent to the step 106, the determination means 62 store in the first buffer memory the values of the signal delivered by the cylinder pressure sensor 30 and collected by the collection means 64 for the current cycle of the cylinder and corresponding to crankshaft angle values from the list 58 of determination parameters stored in the memory 52. When the current cycle of the cylinder has been completed, in a step 110, the determination means 62 calculate the value of the offset $P_{offset}$ from equation (3) as a function of the values $P_0$ and the values of the signal delivered by the sensor and stored in the first buffer memory. This value of the offset $P_{offset}$ is then fed to the means 66 for modifying the conditioning parameters of the conditioning means 32 to update the offset value thereof. There is then a loop from the step 110 to the step 104 of initializing the first buffer memory.

It is clear that the offset is determined continuously, i.e. for each cycle of the cylinder, which enables continuous detection and compensation of drift affecting the signal delivered by the sensor 30.

In a step 120 successive to the initialization step 102, the triggering means 50 carry out a test to determine if the number of kilometers traveled since the last determination of the value of the gain A is greater than or equal to a predetermined kilometers traveled value.

If the result of this test is negative, the triggering means 50 continue to scan for the occurrence of this event.

If the result of this test is positive, in a step 122, the triggering means 50 trigger the determination of the gain A. A second cycle counter (not shown) of the determination means 62 is then initialized to 1 and a second buffer memory (not shown) of the determination means 62 is initialized.

In the next step 124, the determination means 62 carry out a test to determine if the value of the cylinder cycle counter is less than or equal to M. If the result of this test is positive, a reference pressure value $P_0$ for the current cycle of the cylinder is determined and stored in the second buffer memory in a step 126, in a manner similar to that described hereinabove for the determination of the value of the offset.

Similarly, in a step 128, the values of the signal delivered by the sensor 30 for the current cycle of the cylinder and corresponding to the crankshaft angle values stored in the list 58 of parameters for the determination of the gain A are collected by the collection means 64 and stored in the second buffer memory for subsequent use.

In a step 130, the second cylinder cycle counter is incremented by a unit increment equal to 1 at the end of the cylinder cycle and there is a loop from the step 130 to the input side of the step 124.

If the result of the test on the value of the second cylinder cycle counter is negative, in a step 132, the value of the gain A is determined from equation (2) as a function of the reference pressure values and the values of the signal delivered by the sensor stored in the second buffer memory. The newly determined value of the gain A is then fed to the means 66 for modifying the conditioning parameters of the conditioning means 32 to update the value of the gain thereof. There is then a loop from the step 132 to the input side of the step 120.

It is clear that the gain is determined regularly so that drift of the sensor, in particular drift of its sensitivity, is regularly corrected through regular determination of the value of the gain A of the conditioning means.

The choice of values for the parameters M, N, Q, R and S relies on the know-how of the person skilled in the art, who determines these values based on a compromise between the numerical robustness of the conditioning parameter determination process and the calculation time required for that process.

A value of the filling coefficient α is determined for each cylinder type and as a function of the value of the engine rpm.

A cylinder type is defined in particular by the position of the cylinder in the engine. Because of its sensitivity to deformations of the cylinder head, a pressure sensor that measures the pressure in the cylinder by measuring a deformation of its structure delivers a signal that contains a component depending on the deformation of the cylinder head caused by the ignition of fuel in the adjoining cylinders. As the relative disposition of the cylinders in the engine is not symmetrical, the reference pressure $P_0$ depends on the position of the cylinder in the engine. This dependence of the reference pressure on the position of the cylinder is taken into account by means of the filling coefficient α, which depends on the position of the cylinder.

Moreover, it has been observed that the intrinsic gain of a pressure sensor varies slightly as a function of the engine rpm. This dependence of the intrinsic gain of the sensor is taken into account by using a filling coefficient α that is a function of the engine rpm. Thus values of the filling coefficient for this cylinder type are determined for a predetermined set of engine rpm values.

Of course, further dependence of the filling coefficient α on other engine parameters, for example the engine load, may advantageously be used in the system of the invention in order to refine the strategy for calibration of the signal delivered by the sensor 30.

The values of the filling coefficient α are determined beforehand, in particular by determining a filling coefficient value for each (cylinder type, engine rpm) pair of a predetermined set of (cylinder type, engine rpm) pairs. For example, for a selected (cylinder type, engine rpm) pair, it may be a question of determining the gain A of apparatus for acquiring the pressure in a cylinder of the selected type of a test engine for which the value, for example $A_{ref}$, has been determined beforehand using reference sensors. The following procedure is used:

T gain values $A_i$ are calculated from equation (2) with α=1 and M=N=Q=1 and with T very large (for example 2 000 cylinder cycles), the engine rpm and the test load being constant during the T cycles, so that the boost pressure for the crankshaft angle corresponding to the bottom dead centre point is constant for the T cycles, the crankshaft angle values for calculating these gain values being chosen in the manner described above;

a sliding average is calculated over a window of L (for example L=10) gain values $A_i$ to obtain estimated average values $\tilde{A}_i$;

a value of α is determined for the (cylinder type, engine rpm) pair that cancels the average estimation error, i.e. a value of α such that:

$$\sum_{i=1}^{T}(A_{ref} - \alpha \times \tilde{A}_i)^2 = 0$$

In a different embodiment, the engine rpm is constant when determining the gain and the offset, so that the reference pressure for the cylinder is constant. This embodiment therefore avoids having to calculate a new value of the reference pressure for each cycle of the cylinder.

Also, rather than trigger the determination of the gain when a predetermined number of kilometers has been traveled since the last calibration of the gain, the triggering means 50 may trigger calibration of the gain at regular time intervals, for example each time that the time that has elapsed since the last determination of the gain is greater than or equal to a predetermined time threshold value.

Other ways of calculating the gain and the offset of the conditioning means, based on the polytropic model of the pure compression phase of the cylinder cycle, are feasible. Thus it is possible to use a least squares algorithm, an estimator, or other means.

What is claimed is:

1. A system for calibrating apparatus for acquiring the pressure in a cylinder of a motor vehicle diesel engine, comprising a cylinder pressure sensor associated with the cylinder and means for conditioning a signal delivered by the sensor as a function of conditioning parameters, which calibration system comprises:

means for collecting the signal delivered by the cylinder pressure sensor;

an information processing unit adapted to determine the values of the conditioning parameters as a function of a polytropic thermodynamic model of the evolution of the pressure in the cylinder, a predetermined reference pressure of a pure compression phase of the cycle of the cylinder, and the signal delivered by the pressure sensor and collected by the collecting means; and means for modifying the values of the conditioning parameters as a function of the values of the conditioning parameters determined by the information processing units, wherein the information processing unit comprises determination means adapted to determine the value of the conditioning parameters as a function of pressure values in the combustion chamber of a pure compression polytropic model of the cycle of the cylinder from the equation:

$P(\theta) = P_0(V_0/V(\theta))^\gamma$ in which $\theta$ is a value of the crankshaft angle of the cylinder, $V_0$ is the volume of the combustion chamber of the cylinder for a predetermined value of a crankshaft angle of the pure compression phase of the cycle of the cylinder, $P_0$ is a predetermined reference pressure in the combustion chamber for the predetermined value of the crankshaft angle, $\gamma$ is a polytropic coefficient, $V(\theta)$ is the volume of the combustion chamber for the value of the crankshaft angle $\theta$ of the cylinder, and $P(\theta)$ is the pressure in the combustion chamber for the value of the crankshaft angle $\theta$ of the cylinder.

2. system according to claim 1, wherein the determination means are adapted to determine the conditioning parameters of a conditioning model of the signal delivered by the cylinder pressure sensor from the equation:

$P_{meas} = A \times U + P_{offset}$ in which U is the signal delivered by the pressure sensor, $P_{offset}$ is an offset, A is a gain, and $P_{meas}$ is the measured cylinder pressure delivered by the conditioning means.

3. A system according to claim 2, wherein the determination means are adapted to determine the gain A and the offset $P_{offset}$ of the conditioning means from the equations:

$$A = \frac{1}{M} \sum_{j=1}^{M} P_0(j) * \frac{\left(\frac{V_0}{\frac{1}{N}\sum_{i=1}^{N} V(\theta_2^i)}\right)^\gamma - \left(\frac{V_0}{\frac{1}{Q}\sum_{k=1}^{Q} V(\theta_1^k)}\right)^\gamma}{\frac{1}{N}\sum_{i=1}^{N} U(\theta_2^i, j) - \frac{1}{Q}\sum_{k=1}^{Q} U(\theta_1^k, j)}$$

$$P_{offset} = P_0(j) * \frac{\left(\frac{V_0}{\frac{1}{R}\sum_{i=1}^{R} V(\theta_3^i)}\right)^\gamma * \frac{1}{S}\sum_{k=1}^{S} U(\theta_4^k, j) - \left(\frac{V_0}{\frac{1}{S}\sum_{k=1}^{S} V(\theta_4^k)}\right)^\gamma * \frac{1}{R}\sum_{i=1}^{R} U(\theta_3^i, j)}{\frac{1}{S}\sum_{k=1}^{S} U(\theta_4^k, j) - \frac{1}{R}\sum_{i=1}^{R} U(\theta_3^i, j)}$$

in which:

M, N, Q, R and S are predetermined numbers;

$\{\theta_1^k; k=1, \ldots, Q\}$, $\{\theta_2^i; i=1, \ldots, N\}$, $\{\theta_3^i; i=1, \ldots, R\}$ and $\{\theta_4^k; k=1, \ldots, S\}$ are predetermined sets of crankshaft angle values respectively contained in first, second, third and fourth crankshaft angle value windows of the pure compression phase of the cycle;

$\{V(\theta_1^k); k=1, \ldots, Q\}$, $\{V(\theta_2^i); i=1, \ldots, N\}$, $\{V(\theta_3^i); i=1, \ldots, R\}$ and $\{V(\theta_4^k); k=1, \ldots, S\}$ are the sets of values of the volume of the combustion chamber for the sets of crankshaft angle values contained in the first, second, third and fourth windows of the pure compression phase of the cycle of the cylinder, respectively;

$\{U(\theta_1^k,j); k=1, \ldots, Q\}$, $\{U(\theta_2^i,j); i=1, \ldots, N\}$, $\{U(\theta_3^i,j); i=1, \ldots, R\}$ and $\{U(\theta_4^k,j); k=1, \ldots, S\}$ are the sets of values of the signal delivered by the cylinder pressure sensor during the $j^{th}$ cycle of the cylinder for the sets of crankshaft angle values contained in the first, second, third and fourth windows of the pure compression phase of the cycle of the cylinder, respectively; and $P_0(j)$ is the reference pressure for the $j^{th}$ cycle of the cylinder.

4. A system according to claim 3, wherein the values $\theta_1^i$ and $\theta_3^i$ are values of the crankshaft angle at the beginning of the pure compression phase of the cycle of the cylinder and the values $\theta_3^i$ and are values of the crankshaft angle at the end of the pure compression phase of the cycle of the cylinder.

5. A system according to claim 3, wherein each of the crankshaft angle values $\theta_1^i$, $\theta_2^i$, $\theta_3^i$ and $\theta_4^k$ is determined to optimize the signal-to-noise ratio of the signal delivered by the pressure sensor for the value of the crankshaft angle.

6. A system according to claim 1, wherein the engine is equipped with exhaust gas recirculation means connected to a turbocharger and the information processing unit comprises means for determining the reference pressure $P_0$ as a function of the boost pressure at the output of the turbocharger.

7. A system according to claim 6, wherein the means for determining the reference pressure $P_0$ are connected to the determination means and are adapted to determine the reference pressure $P_0$ from the equation:

$P_0 = \alpha \times P_{boost}$ in which $\alpha$ is a value of a filling coefficient and $P_{boost}$ is a value of the boost pressure at the output of the turbocharger for the crankshaft angle of the cylinder corresponding to the bottom dead centre point of the cycle of the cylinder.

8. A system according to claim 7, wherein the information processing unit comprises means for selecting the value of the filling coefficient as a function of the kind of cylinder and the value of the engine rpm.

9. A system according to claim 2, wherein the information processing unit comprises triggering means connected to the determination means and adapted to trigger the determination of the gain of the conditioning model as a function of a predetermined law governing triggering the determination of the gain of the conditioning model.

10. A system according to claim 9, wherein the triggering means are adapted to trigger the determination of the gain of the conditioning model when the motor vehicle has traveled a number of kilometers since the preceding determination of the gain of the conditioning model greater than or equal to a pre-determined kilometer threshold value.

11. A system according to claim 9, wherein the triggering means are adapted to trigger the determination of the gain of the conditioning model when a time has elapsed since the preceding determination of the gain of the conditioning model greater than or equal to a predetermined time threshold value.

12. A system according to claim 2, wherein the determination means are adapted to determine the offset of the conditioning model continuously.

13. A system according to claim 1, wherein the pressure sensor is a sensor adapted to measure a deformation of the structure of the engine.

* * * * *